US010769729B1

(12) United States Patent
Myers et al.

(10) Patent No.: US 10,769,729 B1
(45) Date of Patent: *Sep. 8, 2020

(54) METHOD OF CONTROLLING FOR UNDESIRED FACTORS IN MACHINE LEARNING MODELS

(71) Applicant: State Farm Mutual Automobile Insurance Company, Bloomington, IL (US)

(72) Inventors: Jeffrey S. Myers, Normal, IL (US); Kenneth J. Sanchez, San Francisco, CA (US); Michael L. Bernico, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,038

(22) Filed: Mar. 13, 2019

Related U.S. Application Data

(63) Continuation of application No. 15/383,659, filed on Dec. 19, 2016, now Pat. No. 10,282,789.

(Continued)

(51) Int. Cl.
*G06K 9/00* (2006.01)
*G06Q 40/08* (2012.01)
(Continued)

(52) U.S. Cl.
CPC ........... *G06Q 40/08* (2013.01); *G06K 9/4604* (2013.01); *G06K 9/6202* (2013.01); *G06K 9/66* (2013.01); *G06N 3/08* (2013.01); *H04N 7/185* (2013.01)

(58) Field of Classification Search
CPC ..................................................... G06Q 40/08
See application file for complete search history.

(56) References Cited

U.S. PATENT DOCUMENTS 6,323,761 B1 11/2001 Son
7,813,944 B1 10/2010 Luk et al.
(Continued)

OTHER PUBLICATIONS

Orr Hirschauge; Title: Khosla Ventures Invests in Israeli Medical Imaging Startup Zebra; Wall Street Journal; (4 pages) http://blogs.wsj.com/digits/2015/04/06/khosla-ventures-invests-in-Israeli-medical-imaging-startup-zebra/; Posted: Apr. 6, 2015: 9:58am; Accessed Oct. 19, 2018.
Dana Dovey: Title: Parkinson's Disease May One Day Be Identified With a Voice Analysis Smartphone App; Medical Daily; (6 pages); http://www.medicaldaily.com/parkinsons-disease-may-one-day-be-identified-voice-analysis-smartphone-app-278256; Posted: Apr. 22, 2014; 5:05 pm; Accessed Oct. 19, 2018.
(Continued)

*Primary Examiner* — Solomon G Bezuayehu
(74) *Attorney, Agent, or Firm* — Faegre Drinker Biddle & Reath LLP

(57) ABSTRACT

A method of training and using a machine learning model that controls for consideration of undesired factors which might otherwise be considered by the trained model during its subsequent analyses of new data. For example, the model may be a neural network trained on a set of training images to evaluate an insurance applicant based upon an image or audio data of the insurance applicant as part of an underwriting process to determine an appropriate life or health insurance premium. The model is trained to probabilistically correlate an aspect of the applicant's appearance with a personal and/or health-related characteristic. Any undesired factors, such as age, sex, ethnicity, and/or race, are identified for exclusion. The trained model receives the image (e.g., a "selfie") of the insurance applicant, analyzes the image without considering the identified undesired factors, and suggests the appropriate insurance premium based only on the remaining desired factors.

16 Claims, 5 Drawing Sheets

Related U.S. Application Data

(60) Provisional application No. 62/273,624, filed on Dec. 31, 2015, provisional application No. 62/272,184, filed on Dec. 29, 2015.

(51) Int. Cl.
   *G06K 9/62* (2006.01)
   *H04N 7/18* (2006.01)
   *G06N 3/08* (2006.01)
   *G06K 9/66* (2006.01)
   *G06K 9/46* (2006.01)

(56) References Cited

U.S. PATENT DOCUMENTS

| | | | |
|---|---|---|---|
| 8,460,220 | B2 | 6/2013 | Cuddihy |
| 9,186,111 | B2 | 11/2015 | Jeanne |
| 9,824,453 | B1* | 11/2017 | Collins ............... G06F 16/5838 |
| 10,210,577 | B1* | 2/2019 | Davis ..................... G06Q 40/08 |
| 10,282,789 | B1 | 5/2019 | Myers et al. |
| 2005/0228236 | A1* | 10/2005 | Diederich ............ A61B 5/7267 600/300 |
| 2008/0292151 | A1 | 11/2008 | Kurtz |
| 2009/0265193 | A1 | 10/2009 | Collins et al. |
| 2010/0114743 | A1 | 5/2010 | Misraje et al. |
| 2011/0161117 | A1 | 6/2011 | Busque et al. |
| 2012/0191594 | A1 | 7/2012 | Welch |
| 2013/0096954 | A1 | 4/2013 | Bodas |
| 2013/0166325 | A1* | 6/2013 | Ganapathy ............. G06Q 40/08 705/4 |
| 2014/0103212 | A1 | 4/2014 | Damarla |
| 2014/0121540 | A1 | 5/2014 | Raskin |
| 2014/0156313 | A1 | 6/2014 | Rogers |
| 2014/0358592 | A1 | 12/2014 | Wedig et al. |
| 2015/0025917 | A1 | 1/2015 | Stempora |
| 2015/0373039 | A1 | 12/2015 | Wang |
| 2016/0078544 | A1 | 3/2016 | Brady |
| 2016/0162802 | A1 | 6/2016 | Chickering et al. |
| 2016/0203263 | A1 | 7/2016 | Maier et al. |
| 2017/0177927 | A1 | 6/2017 | Fujita |
| 2018/0144409 | A1 | 5/2018 | Brown |

OTHER PUBLICATIONS

Lina Zeldovich; Title: This app claims it can detect cancer by the sound of your voice; Digital Trends; (10 pages); http://www.digitaltrends.com/sports/kijini-health-app/; Posted: Jun. 13, 2015; 3:00 am; Accessed: Oct. 19, 2018.

(Fredo Durand, William T Freeman, Guha Balakrisnan, Kathrine L Bouman, Justin G Chen, Abe Davis, Hossein Mobahi, Michael Rubinstein, Neal Wadhwa, Hao-Yu-Wu, and Tianfan Xue); Title: Video Magnification; (4 pages); http://people.csail.mit.edu/rub/vidmag/; Posted: Jun. 2015; Accessed: Oct. 25, 2018.

(Edward H Adelson, Oral Buyukozturk, Anat Levin, Ce Liu, John Guttag, Gautham J Mysore, Eugene Shih, Antonio Torrable) Title: MIT Video Magnification: 7 pages; http://people.csail.mit.edu/rub/vidmag/; Posted: Jun. 2015; Accessed: Oct. 25, 2018.

"Estimating Car Insurance Premia: a Case Study in High-Dimensional Data Inference," Nicolas Chapados, Yoshua Bengio, Pascal Vincent, Joumana Ghosn, Charles Dugas, Ichiro Takeuchi, Linyan Meng, Advances in Neural Information Processing Systems. 2002 (Year: 2002).

"Fairness-Aware Classifier with Prejudice Remover Regularizer," Toshihiro Kamishima, Shotaro Akaho, Hideki Asoh, and Jun Sakuma, P. Flach et al. (Eds.): ECML PKDD 2012, Part II, LNCS 7524, pp. 35-50, 2012. c Springer-Verlag Berlin Heidelberg 2012 (Year: 2012).

"Learning Fair Representations," Richard Zemel, Yu (Ledell) Wu, Kevin Swersky, Toniann Pitassi, Proceedings of the 30th International Conference on Machine Learning, Atlanta, Georgia, USA, 2013 (Year: 2013).

"Why Valuable Item Insurance Is Important." FreeAdvice, Mar. 11, 2012, insurance.freeadvice.com/information/home/article/292, (Year: 2012).

Homeowner Insurance Questionnaire. Gulfshore Insurance, Jan. 1, 2012, www.gulfshoreinsurance.com/wp-content/uploads/2011 /12/Home-Quote-Questionnaire.pdf, (Year: 2012).

Edwards et al. (Censoring Representations with an Adversary, Nov. 2015, pp. 1-13) (Year: 2015).

* cited by examiner

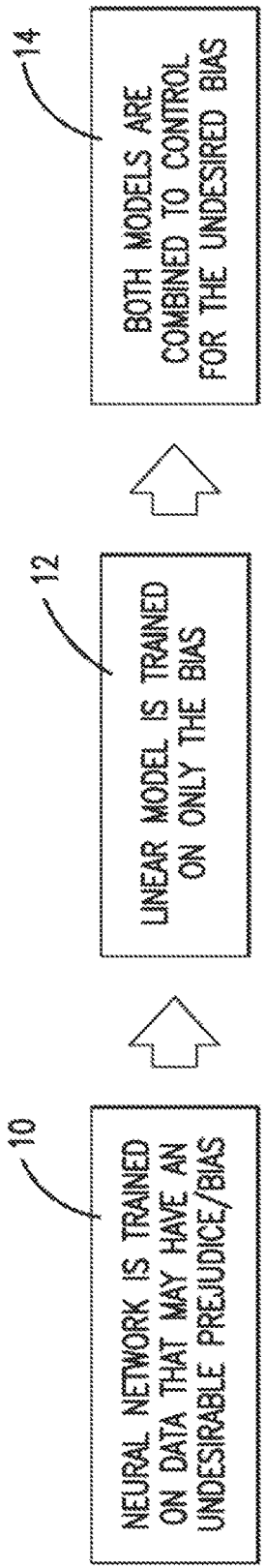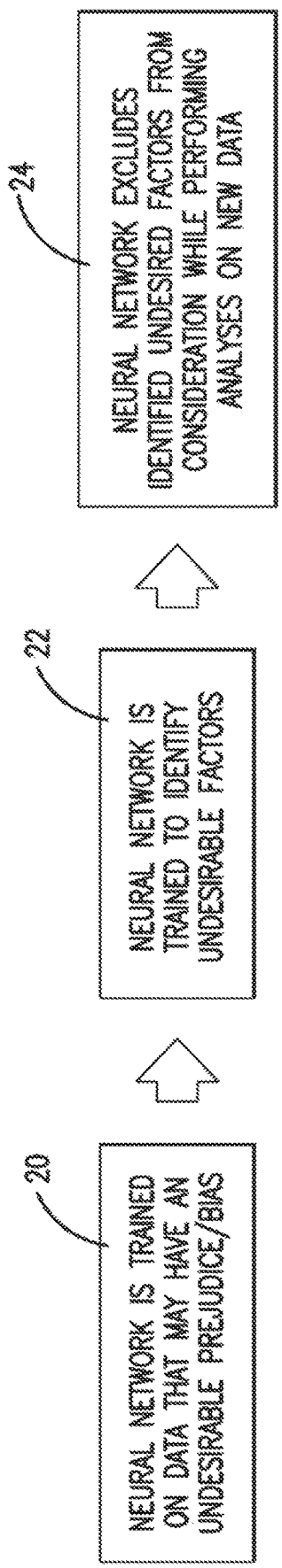

METHOD OF CONTROLLING FOR UNDESIRED FACTORS IN MACHINE LEARNING MODELS

RELATED APPLICATIONS SECTION

The present application is a continuation of, and claims the benefit of, U.S. patent application Ser. No. 15/383,659, filed Dec. 19, 2016 and entitled "Method of Controlling for Undesired Factors in Machine Learning Models," which is related to and claims priority benefit of an earlier-filed provisional patent application having the same title, Ser. No. 62/272,184, filed Dec. 29, 2015, and a second earlier-filed provisional patent application having the same title, Ser. No. 62/273,624, filed Dec. 31, 2015. Further, the present application is related to a first co-filed U.S. non-provisional patent application having the same title, Ser. No. 15/383,499, filed Dec. 19, 2016, and to a second co-filed U.S. patent application having the same title, Ser. No. 15/383,567, filed Dec. 19, 2016. The entire contents of the identified earlier- and co-filed applications are hereby incorporated by reference into the present application as if fully set forth herein and their entireties.

FIELD OF THE INVENTION

The present disclosure generally relates to methods of training and using machine learning models. More particularly, the present disclosure concerns a method of training and using a machine learning model that controls for the model's consideration of one or more undesired factors which might otherwise be considered by the model in operation.

BACKGROUND

Machine learning models may be trained to analyze information for particular purposes involving identifying correlations and making predictions. During training, the models may learn to include illegitimate, non-useful, irrelevant, misleading, or otherwise undesired factors, especially if such biases are present in the training data sets. In particular, while training with structured data involves limiting the data that a model considers, training with unstructured data allows the model to consider all available data, including background information and other undesired factors. For example, a neural network trained with unstructured data including people's appearances to make correlations and predictions about those people may consider such undesired factors as age, sex, ethnicity, and/or race in its subsequent analyses.

BRIEF SUMMARY

Embodiments of the present technology relate to machine learning models that control for consideration of one or more undesired factors which might otherwise be considered by the machine learning model when analyzing new data. For example, one embodiment of the present invention may be configured for training and using a neural network that controls for consideration of one or more undesired factors which might otherwise be considered by the neural network when analyzing new data as part of an underwriting process to determine an appropriate insurance premium.

In a first aspect, a method of training and using a machine learning model that controls for consideration of one or more undesired factors which might otherwise be considered by the machine learning model may broadly comprise the following. The machine learning model may be trained using a training data set that contains information including the undesired factors. The undesired factors and one or more relevant interaction terms between the undesired factors may be identified. The machine learning model may then be caused to not consider the identified undesired factors when analyzing the new data to control for undesired prejudice or discrimination in machine learning models.

In a second aspect, a computer-implemented method for training and using a machine learning model to evaluate an insurance applicant as part of an underwriting process to determine an appropriate insurance premium, wherein the machine learning model controls for consideration of one or more undesired factors which might otherwise be considered by the machine learning model, may broadly comprise the following. The machine learning model may be trained to probabilistically correlate an aspect of appearance with a personal and/or health-related characteristic by providing machine learning model with a training data set of images of individuals having known personal or health-related characteristics, including the undesired factors. The undesired factors and one or more relevant interaction terms between the undesired factors may be identified. An image of the insurance applicant may be received via a communication element. The machine learning model may analyze the image of the insurance applicant to probabilistically determine the personal and/or health-related characteristics for the insurance applicant, wherein such analysis excludes the identified undesired factors. The machine learning model may then suggest the appropriate insurance premium based at least in part on the probabilistically determined personal and/or health-related characteristic but not on the undesired factors.

Various implementations of these aspects may include any one or more of the following additional features. Identifying the undesired factors and relevant interaction terms may include training a second machine learning model using a second training data set that contains only the undesired factors and the relevant interaction terms. Further, causing the machine learning model to not consider the identified undesired factors when analyzing the new data may include combining the machine learning model and the second machine learning model to eliminate a bias created by the undesired factors from the machine learning model's consideration prior to employing the machine learning model to analyze the new data. Alternatively or additionally, identifying the undesired factors and relevant interaction terms may include training the machine learning model to identify the undesired factors and the one or more relevant interaction terms. Further, causing the machine learning model to not consider the identified undesired factors when analyzing the new data may include instructing the machine learning model to not consider the identified undesired factors while analyzing the new data. The machine learning model may be a neural network. The second machine learning model may be a linear model. The machine learning model may be trained to analyze the new data as part of an underwriting process to determine an appropriate insurance premium, and the new data may include images of a person applying for life insurance or health insurance or images of a piece of property for which a person is applying for property insurance. The machine learning model may be further trained to analyze the new data as part of the underwriting process to determine one or more appropriate terms of coverage.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 1 is a high level flowchart of a first exemplary embodiment of an aspect of the present technology involving training and using a machine learning model;

FIG. 2 is a high level flowchart of a second exemplary embodiment of an aspect of the present technology involving training and using a machine learning model;

Figure 3:
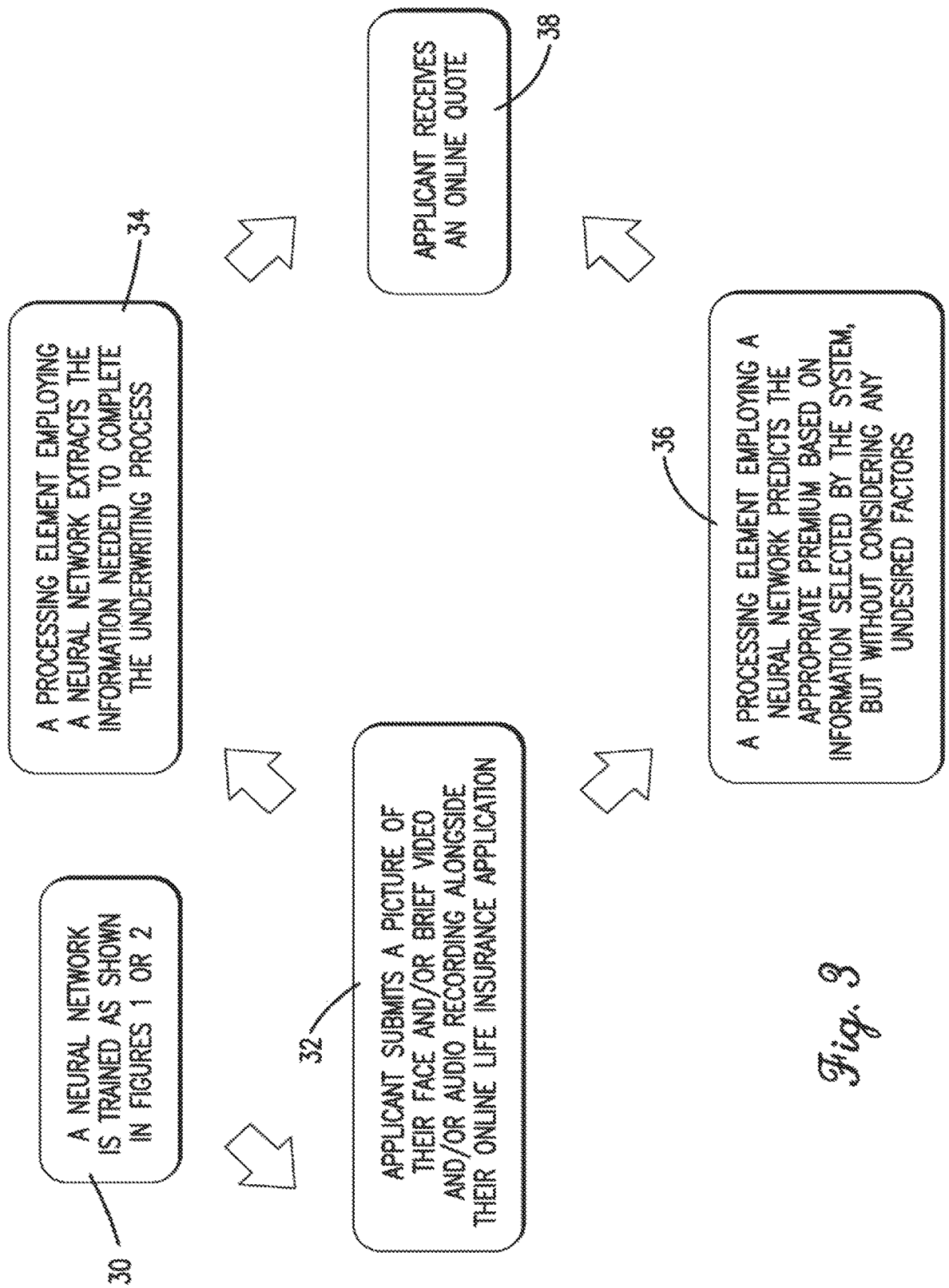
FIG. 3 is a high level flowchart of an exemplary computer-implemented method of evaluating a life or health insurance applicant involving the machine learning models of FIG. 1 or 2.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter cilia, training and using machine learning models that control for consideration of one or more undesired factors which might otherwise be considered by the machine learning model when analyzing new data. For example, one embodiment of the present invention may be configured for training and using a neural network that controls for consideration of one or more undesired factors which might otherwise be considered by the neural network when analyzing new data as part of an underwriting process to determine an appropriate insurance premium and/or other terms of coverage.

Machine learning models may be trained to analyze information for particular purposes, such as insurance underwriting, involving identifying correlations and making predictions. During training, the models may learn to include undesired factors, especially if such biases are present in the training data sets. In particular, while training with structured data involves limiting the data that a model considers, training with unstructured data allows the model to consider all available data, including background information and undesired factors. For example, a neural network trained with unstructured data including people's appearances to make correlations and predictions about those people may consider such undesired factors as age, sex, ethnicity, and/or race in its subsequent analyses of new data.

The present technology concerns a method of training and using a machine learning model that filters or otherwise controls for bias based upon these undesired factors, including controlling for such bias in models having unknown levels of bias. Broadly, this may be accomplished in various ways. In a first exemplary embodiment, the one or more undesired factors may be eliminated from the neural network's consideration prior to it performing subsequent analyses of new data. In an exemplary second embodiment, the neural network may itself be trained to identify the one or more undesired factors and then ignore them while performing subsequent analyses of new data.

In the first embodiment, a neural network may be trained on data that contains one or more undesired factors, a linear model may then be trained only on the undesired factors and the one or more relevant interaction terms between the one or more undesired factors, and then both models may be combined to control for the bias created by the undesired factors. Referring to FIG. 1, the neural network may be trained using the training data set, as shown in 10. The training dataset may include images, sounds, or other data containing information about example subjects. For example, the information may concern one or more characteristics of an individual or a property for which an insurance (e.g., life, health, or property insurance) is sought. Based upon correlations discovered through such training, the neural network may learn to analyze new subjects. However, the neural network may learn to include the one or more undesired factors in its analysis if such factors are present in the training data set. The output of this model may be referred to as "Y_Initial".

A linear model may be built on the one or more factors considered undesirable in the data and the relevant interaction terms between those variables, as shown in 12. This second model may have terms for all of the one or more undesired factors (e.g., B1, B2, . . . , Bn).

A new model may then be created which combines the trained neural network and the linear model, and which thereby controls for the undesired factors so that they are not considered when analyzing new data as part of the underwriting process to determine the appropriate insurance premium and/or other terms of coverage, as shown in 14. The new model may be referred to as "Y_Final", wherein Y_Final=Y_Initial+B1*X1+B2*X2+ . . . +Bn*Xn. X1, X2, . . . , Xn may represent relative portions of the population containing the bias. Y_Final may then be known to not depend on any bias the neural network may have initially learned.

In the second embodiment, referring to FIG. 2, the neural network may again be trained on data that contains one or more undesired factors, as shown in 20. The same neural network may be trained to identify the undesired factors and the one or more relevant interaction terms between the one or more undesired factors, as shown in 22. The neural network may then be instructed to not consider the identified undesired factors while analyzing new data as part of the underwriting process to determine the appropriate insurance premium and/or other terms of coverage, as shown in 24.

In an exemplary application, the machine learning model may be a neural network trained on a set of training images to evaluate an insurance applicant based upon an image of the insurance applicant as part of an underwriting process to determine an appropriate life or health insurance premium and/or other terms of coverage. The model may be trained to probabilistically correlate an aspect of the applicant's appearance with a personal and/or health-related characteristic. The trained model may receive the image (e.g., a "selfie") of the insurance applicant, analyze the image while excluding the identified undesired factors in accordance with the first or second embodiments discussed above, and suggest or recommend the appropriate insurance premium and/or other terms of coverage based only on the remaining desired factors.

In more detail, referring to FIG. 3, once the neural network is trained in accordance with the first or second embodiments discussed above and shown in FIGS. 1 and 2, as shown in 30, a processing element employing the neural network may receive a still and/or moving (i.e., video) image and/or voice recording of an insurance applicant, as shown in 32. The processing element employing the neural network may then extract information to complete the underwriting process, as shown in 34, such as verifying information provided by the applicant and/or answering underwriting questions, and/or may substantially automate aspects of the underwriting process by directly predicting and suggesting the appropriate insurance premium and/or other terms of coverage, as shown in 36. The applicant may then quickly be provided with a rate quote, as shown in 38.

The neural network may be a convolutional neural network (CNN) and/or a deep learning neural network, A CNN is a type of feed-forward neural network often used in facial recognition systems, in which individual neurons may be tiled so as to respond to overlapping regions in the visual field. A CNN may include multiple layers of small neuron collections which examine small portions of an input image, called receptive fields. The results of these collections may be tiled so that they overlap to better represent the original image, and this may be repeated for each layer. Deep learning involves algorithms that attempt to model high-level abstractions in data by using model architectures, with complex structures or otherwise, composed of multiple non-linear transformations. An image may be represented in various ways, such as a vector of intensity values per pixel, a set of edges, or regions of particular shape. Certain representations may better facilitate learning how to identify personal and health-related information from examples.

The large sample of still and/or moving (e.g., video images and/or voice recordings used to train the neural network may be, for example, provided by volunteers, existing policy holders, or taken from social media. The still and/or moving (e.g., video) image and/or voice recording received from the applicant may be analog or digital and otherwise non-diagnostic and conventional in nature, such as an ordinary "selfie" taken by the insurance applicant or him- or herself. The videos may include audio of the applicants' voices, and the neural network's training and analysis may include similarly seeking relevant characteristics or patterns in voices. The neural network's analyses of images may be probabilistic, such that the resulting data may be associated with varying degrees of certainty.

Thus, exemplary embodiments and applications may involve probabilistically evaluating applicants for life and/or other insurance and determining appropriate premiums and/or other terms of coverage based upon analyses of still and/or moving images, and/or voice recordings of the applicants and without requiring conventional medical examinations and while excluding undesired factors from the analyses. For descriptive purposes, exemplary applications of the technology are described herein in detail with regard to facilitating underwriting of life and/or health insurance, but it will be appreciated that the technology is similarly applicable to underwriting other forms of insurance, such as property insurance.

I. Exemplary Computer System

Figure 4:
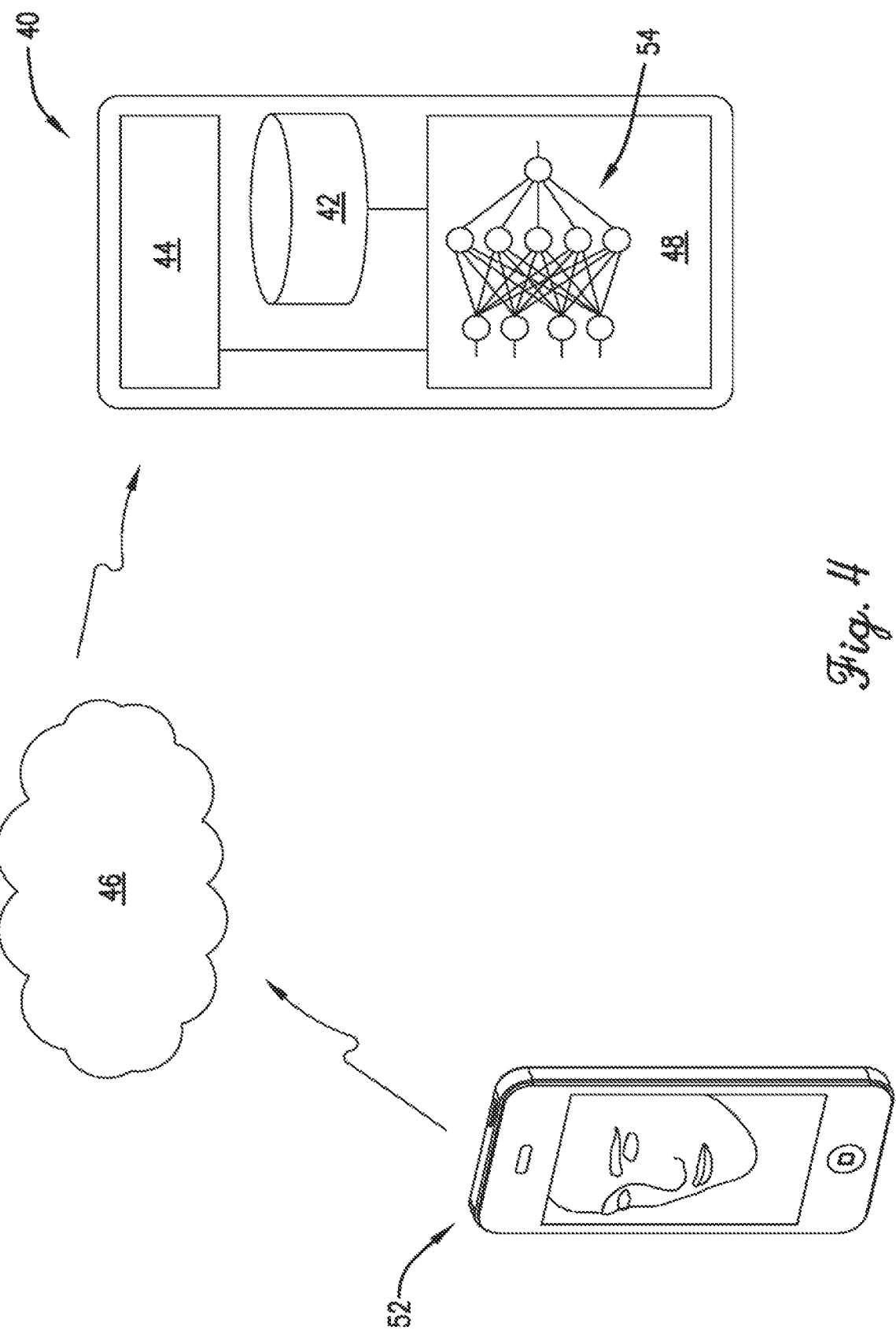
FIG. 4 is a diagram of an exemplary system constructed in accordance with embodiments of the present technology.

Referring to FIG. 4, an exemplary computer system 40 is shown configured for evaluating an insurance applicant as part of an underwriting process to determine one or more appropriate terms of life or other insurance coverage, which may include appropriate premiums or discounts. The system 40 may broadly comprise a memory element 42 configured to store information, such as the database of training images and/or voice recordings; a communication element 44 configured to receive and transmit signals via a network 46, including receiving the applicant's image and/or voice recording; and/or a processing element 48 employing a neural network 54 trained and configured to analyze the applicant's image and/or voice recording.

More specifically, the memory element 42 may generally allow for storing information, such as the database of still and/or moving (e.g., video) images and/or voice recordings used to train the processing element 48, and still and/or moving (e.g., video) images and/or voice recordings received from applicants. The memory element 42 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 42 may include, or may constitute, a "computer-readable medium." The memory element 42 may further store instructions, code, code segments, software, firmware, programs, applications, apps, services, daemons, or the like that are executed by the processing element 48. The memory element 42 may also store additional settings, data, documents, sound files, photographs, movies, images, databases, and the like. The memory element 42 may be electronically coupled or otherwise in electronic communication with the communication element 44 and the processing element 48.

The communication element 44 may generally allow for communication with remote systems or devices, including a system or device 52, such as a smartphone or other mobile communication device, configured to capture the still and/or moving (e.g., video) image and/or voice recording of the applicant. The communication element 44 may include signal or data transmitting and receiving circuits, such as antennas, amplifiers, filters, mixers, oscillators, digital signal processors (DSPs), and the like. The communication element 44 may establish communication wirelessly by utilizing radio-frequency (RF) signals (and/or one or more radio links) and/or data that comply with communication standards such as cellular 2G, 3G, or 4G, IEEE 802.11 standard (such as WiFi), IEEE 802.16 standard (such as WiMAX), Bluetooth™, or combinations thereof. The communication element 44 may be electronically coupled or otherwise in electronic communication with the memory element 42 and the processing element 48.

The network 46 may be embodied by a local, metro, or wide area network (LAN, MAN, or WAN) and may be formed using a plurality of known architectures and topologies. In some embodiments, a portion of the network 46 may be formed by at least a portion of the Internet, by communication lines that are leased from other entities, or by combinations thereof. The network 46 may be implemented within a small area such as city or across a larger area such as a region or country.

The processing element 48 may employ the neural network 54 trained in accordance with the first or second embodiments discussed above and shown in FIGS. 1 and 2 to probabilistically correlate one or more aspects of appearance and/or voice with one or more personal or health-related characteristics by being provided with the database of still and/or moving (e.g., video) images and/or voice recordings stored in the memory element 42 of individuals having known personal or health-related characteristics. The neural network 54 may be a CNN or a deep learning neural network. The processing element 48 employing the neural network 54 may be configured to analyze the still and/or moving image and/or voice recording of the insurance applicant received via the communication element 44 to probabilistically determine the personal or health-related characteristic for the insurance applicant to facilitate the completion of the underwriting process and/or to suggest one or more appropriate terms of insurance coverage, such as an appropriate premium or discount, based at least in part on the probabilistically determined personal or health-related characteristic but without considering any undesired factors.

The processing element 48 may include one or more processors, microprocessors, microcontrollers, DSPs, field-programmable gate arrays (FPGAs), analog and/or digital application-specific integrated circuits (ASICs), or the like, or combinations thereof. The processing element 48 may generally execute, process, or run instructions, code, code segments, software, firmware, programs, applications, apps, processes, services, daemons, or the like. The processing element 48 may also include hardware components such as finite-state machines, sequential and combinational logic, and other electronic circuits that may perform the functions necessary for the operation of embodiments of the current inventive concept. The processing element 48 may be in electronic communication with the memory element 42 and the communication element 44. For example, the processing element 48 may communicate with these and possibly other electronic components through serial or parallel links that include address busses, data busses, control lines, and the like.

The system 40 may include more, fewer, or alternative components and/or perform more, fewer, or alternative actions, including those discussed elsewhere herein, and particularly those discussed in the following section describing the computer-implemented method.

II. Exemplary Computer-Implemented Method

Figure 5:
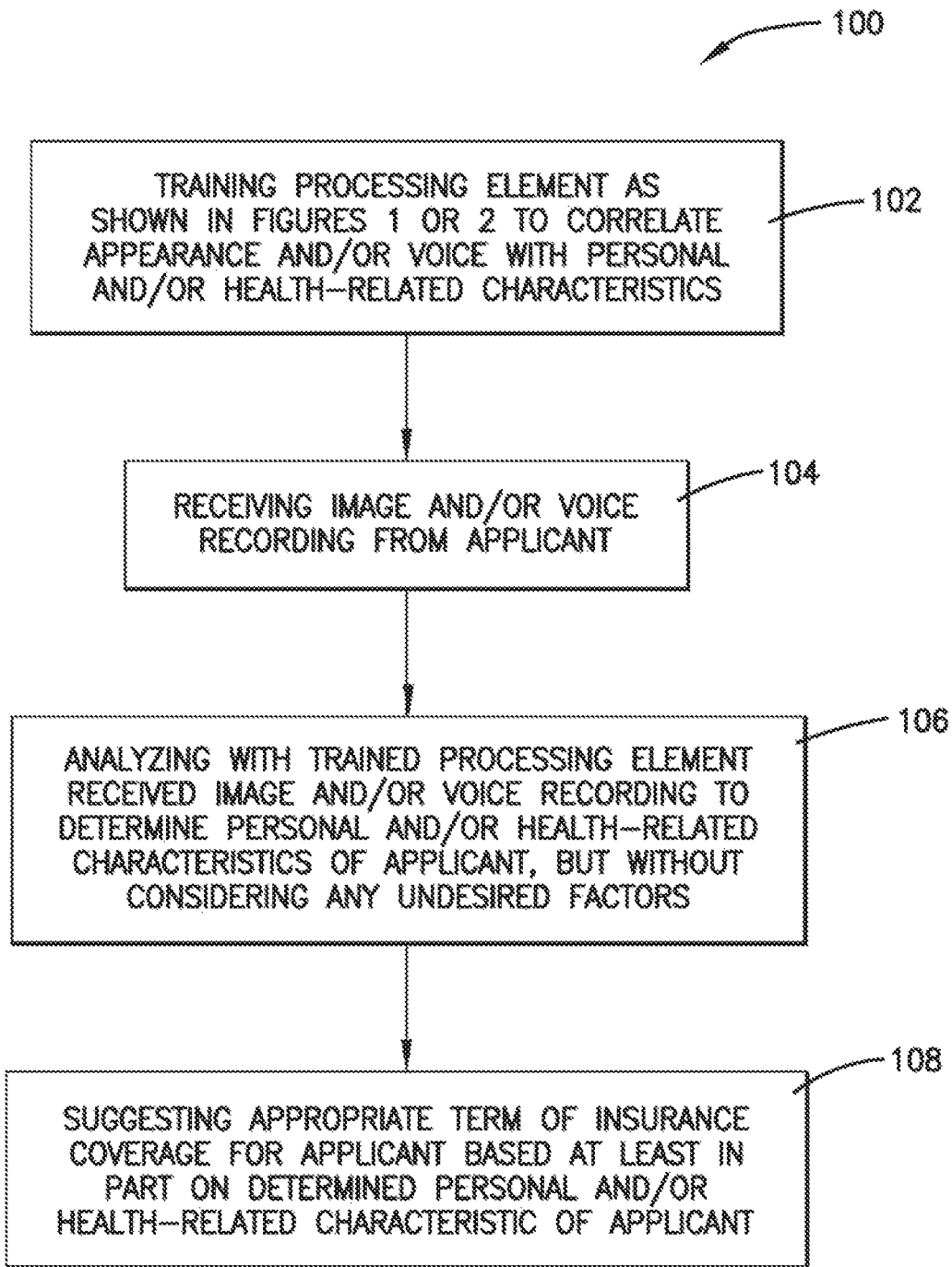
FIG. 5 is a flowchart of an exemplary computer-implemented method practiced in accordance with embodiments of the present technology.

Referring to FIG. 5, an exemplary computer-implemented method 100 is shown for evaluating an insurance applicant as part of an underwriting process to determine one or more appropriate terms of life or other insurance coverage, which may include appropriate premiums or discounts, such as discounts for risk averse individuals or those living a healthy life style. Broadly, the computer-implemented method may comprise the following actions. The processing element 44 employing the neural network 54 may be trained in accordance with the first or second embodiment discussed above and shown in FIGS. 1 and 2 to probabilistically correlate a one or more aspects of appearance and/or voice with a personal or health-related characteristic by providing the neural network 54 with the database stored on the memory element 42 of still and/or moving (e.g., video) images and/or voice recordings of individuals having known personal or health-related characteristics, as shown in 102. The communication element 44 may receive the still and/or moving image and/or voice recording of the insurance applicant, as shown in 104. The still and/or moving (e.g., video) image and/or voice recording received from the applicant may be analog or digital and otherwise non-diagnostic and conventional in nature, such as an ordinary selfie taken by the insurance applicant or him- or herself. The trained neural network 54 employed by the processing element 48 may analyze the image of the insurance applicant to probabilistically determine the personal or health-related characteristic for the insurance applicant, as shown in 106. The processing element 48 employing the neural network 54 may suggest or recommend the appropriate term of insurance coverage, such as an appropriate premium, based at least in part on the probabilistically determined personal or health-related characteristic but without considering any undesired factors, as shown in 108.

The computer-implemented method may include more, fewer, or alternative actions, including those discussed elsewhere herein.

III. Exemplary Computer-Readable Medium

Referring again to FIGS. 4 and 5, an exemplary non-transitory computer-readable medium with one or more executable programs stored thereon may be configured for evaluating an insurance applicant as part of an underwriting process to determine one or more appropriate terms of life or other insurance coverage, which may include appropriate premiums. Broadly, the one or more programs may instruct the communication element 44, processing element 48, neural network 54, and/or other components of the system 40 to perform the following actions. The neural network 54 may be trained in accordance with the first or second embodiment discussed above and shown in FIGS. 1 and 2 to probabilistically correlate a one or more aspects of appearance and/or voice with a personal or health-related characteristic by providing the processing element 48 employing the neural network 54 with the database stored on the memory element 42 of still and/or moving (e.g., video) images, and/or voice recordings of individuals having known personal or health-related characteristics, as shown in 102. The communication element 44 may be instructed to receive the still and/or moving image, and/or voice recording of the insurance applicant, as shown in 104. The still and/or moving image, and/or voice recording received from the applicant may be analog or digital and otherwise non-diagnostic and conventional in nature, such as an ordinary selfie taken by the insurance applicant or him- or herself. The trained neural network 54 employed by processing element 48 may be instructed to analyze the image of the insurance applicant to probabilistically determine the personal or health-related characteristic for the insurance applicant, as shown in 106. The processing element 48 employing the trained neural network 54 may be instructed to suggest the appropriate term of insurance coverage, such as an appropriate premium, based at least in part on the probabilistically determined personal and/or health-related characteristic but without considering any undesired factors, as shown in 108.

The one or more executable programs stored on the non-transitory computer-readable medium may instruct the system 40 to perform more, fewer, or alternative actions, including those discussed elsewhere herein, and particularly those discussed in the section describing the computer-implemented method.

IV. Exemplary Video Functionality

In one aspect, a video magnification system may use a short video of an applicant and extract the necessary health and personal data without the need for fluid samples or medical review. For example, the video may be used to calculate the applicant's pulse, and could evolve to detect medications or drug use through eye movements, and lead to other information such as glucose levels and other measurements normally attained through bodily fluid analysis. The results may be used to either answer underwriting questions or automate the underwriting process by predicting the appropriate premium directly. Also, the use of video magnification data may help prevent fraud (or buildup) by removing applicants' ability to enter fraudulent information and ensuring an applicant's identity.

In one embodiment, an online life or health insurance applicant may be filling out a virtual insurance application online, such as via their mobile device or another computing device. The virtual insurance application may ask the applicant to submit a short video or images of themselves, such as taken via their mobile device, for use with generating or adjusting an insurance quote, policy, premium, or discount (such as a life or health insurance application). The applicant may transmit the short video or images of themselves from their mobile device to an insurance provider remote server via wireless communication or data transmission over one or more radio links, or otherwise electronically attach the short video or images to the virtual insurance application. Then with the customer's permission or affirmative consent, the insurance provider remote server or another processor may analyze the short video or images, such as via video magnification or other digital image techniques, to identify risk, or lack thereof, associated with the applicant, or otherwise determine certain health characteristics of the applicant. For instance, pulse, heart rate, medication or drug use, cigarette or alcohol use, glucose levels, cholesterol level, age, weight, an amount of exercise, sex, etc. may be determined from video or image analysis (such as be noticing pulse movement or eye movement). As an example, cigarette use may be determined from image analysis of a person's teeth or gums, cholesterol level may be determined from image analysis of a person's eyes, pulse or heart rate may be determined from image analysis of a person's neck or veins.

Based upon the risk, or lack thereof identified, or health characteristics determined (such as pulse or glucose levels), the insurance provider may estimate an insurance premium or discount for the applicant, and transmit the insurance premium or discount to the applicant's mobile device, via wireless communication or data transmission over one or more radio links, for the applicant's review, approval, or modification. As a result, an online customer shopping experience for life or health insurance may be enhanced, and the need for invasive procedures, such as giving blood and/or visiting a medical lab to have blood work performed, may be reduced.

V. Exemplary Audio Functionality

In another aspect, audio analysis techniques may use an audio recording of an applicant's voice and extract the necessary health and personal data without the need for fluid samples or medical review. The voice analysis system may learn to identify patterns and characteristics in voice recordings that are indicative of the presence of certain diseases or medications, or be able to detect other characteristics of an applicant, such as tobacco use. The results may be used to either answer underwriting questions or automate the underwriting process by predicting the appropriate premium directly. Further, the use of the audio analysis system may help prevent fraud (or buildup) by removing applicants' ability to enter fraudulent information and ensuring an applicant's identity.

In one embodiment, an online life or health insurance applicant may be filling out a virtual insurance application online, such as via their mobile device or another computing device. The virtual insurance application may ask the applicant to submit a short audio of themselves, such as recorded via their mobile device (e.g., voice recorded within a video), for use with generating or adjusting an insurance quote, policy, premium, or discount (such as a life or health insurance application). The applicant may transmit the short audio recording of themselves from their mobile device to an insurance provider remote server, or otherwise electronically attach the short audio recording to the virtual insurance application.

Then with the customer's permission or affirmative consent, the insurance provider remote server or another processor may analyze the short audio recording, such as via audio analysis or other digital audio processing techniques, to identify risk, or lack thereof, associated with the applicant, or otherwise determine certain health characteristics of the applicant. For instance, certain diseases or medication use, as well as cigarette use, age, weight, sex may be determined or estimated from audio analysis. Based upon the risk, or lack thereof identified, or health characteristics determined (such as lack of smoking), the insurance provider may estimate an insurance premium or discount for the applicant, and transmit the insurance premium or discount to the applicant's mobile device, via wireless communication or data transmission, for the applicant's review, approval, or modification.

VI. Exemplary Computer-Implemented Methods

Figure 6:
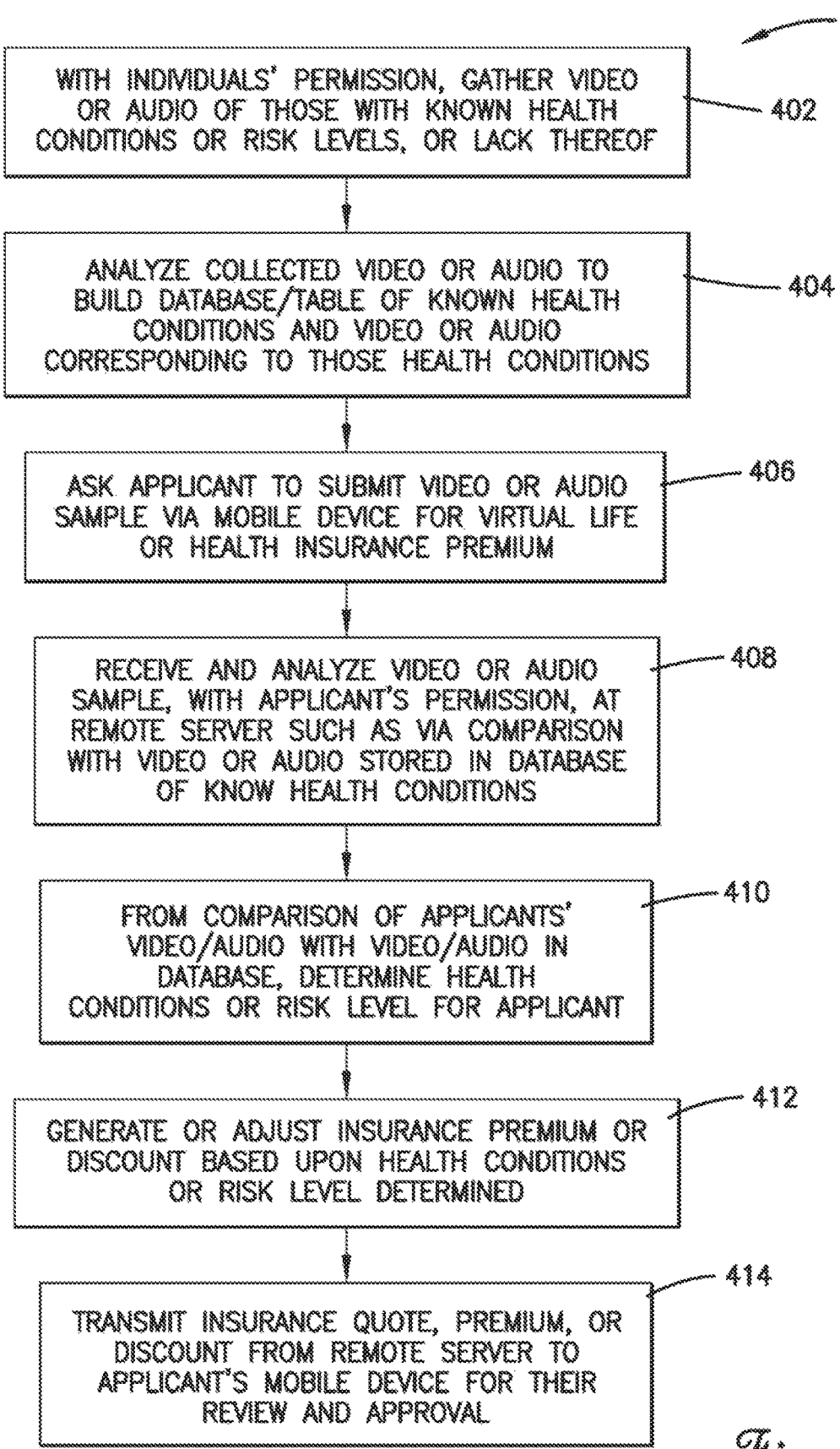
FIG. 6 is a flowchart of an exemplary computer-implemented method of providing life or health insurance quotes based upon, at least in part, video, image, or audio data samples received via wireless communication or data transmission from an applicant's mobile device.

FIG. 6 depicts an exemplary computer-implemented method 400 of providing life or health insurance quotes based upon, at least in part, video, image, or audio data samples received via wireless communication or data transmission from an applicant's mobile device. The method 400 may include with an individuals' permission, gathering video, images, or audio of those with known health conditions or risk levels, or lack thereof 402. For instance, images, and/or audio of those with certain diseases, associated with certain medication or drug use, associated with cigarette or alcohol usage, of a certain age or weight, of a specific cholesterol or glucose level, or having other specific health conditions or risk levels, or a lack of a health condition or ailment, or having a low risk level.

The method 400 may include analyzing the collected video, image(s), or audio to build a database, table or other data structure corresponding to the known health conditions 404, For instance, a two column data structure could include exemplary video, image(s), or audio (stored or linked to by a pointer in column 1) that is associated with a certain health condition or risk level (that is stored in column 2 of the data structure or table). Additionally or alternatively, instead of building a database, a neural network may be trained to identify certain health conditions or risk levels from processor analysis of video, images, or audio of individuals having known health conditions or ailments, such as described elsewhere herein.

The method 400 may include asking an insurance applicant to submit a video, image, or audio sample via their mobile device for a virtual life or health insurance application 406. For instance, after a database or neural network is trained to identify health conditions or health risk from video, image, or audio analysis, an online or virtual insurance application form may include functionality that allows an application to attach a video, image, or audio sample to a virtual application using their mobile device. The virtual application may give an applicant the option submitting video, image, or audio data of themselves, and ask for consent for an insurance provider to analyze the data sample submitted. In return, the applicant may not be required to submit to invasive procedures, such as drawing blood (or even a visit to nurse or doctor), and risk averse applicants may be entitled to a discount, such as those that don't smoke or drink heavily, or that exercise or otherwise live a health conscious life.

The method 400 may include analyzing the video, image, or audio data sample received from the application with the applicant's permission or affirmative consent 408. For instance, the applicant's mobile device may transmit the video, image, or audio data sample to an insurance provider remote server, and the data sample may be analyzed via comparison of video, image, or audio data stored in the database of known health conditions, or otherwise used to train a neural network.

The method 400 may include, from comparison of the online applicants' video, image, or audio data sample with video, image, audio data stored in the database (or used to train the neural network) to determine health conditions or risk level for the applicant 410. From analysis of the data sample various health conditions may be determined via a processor, such as sex, weight, body mass index, cholesterol, amount of exercise, cigarette or alcohol use, medication or drug use, certain diseases or ailments, glucose levels, and other health conditions or risks, including those discussed elsewhere herein.

The method 400 may include generating or adjusting (such as at an insurance provider remote server) an insurance policy, premium, or discount based upon the health conditions or risk levels determined 412. For instance, risk averse applicants may have their lack of risk verified via their video, image, or data samples, such as lack of smoking or drug use, or an appropriate amount of exercise. As a result, those applicants may receive an online insurance discount on health or life insurance, for instance.

The method 400 may include transmitting an insurance quote, premium, or discount from an insurance provider remote server to the applicant's mobile device for their review and approval 414. For instance, a quote for insurance may be transmitted to an applicant's mobile or other computing device for their review and approval via wireless communication and/or data transmission to enhance on online customer experience associated with shopping for and/or receiving binding life or health insurance.

In another aspect, a computer-implemented method for evaluating an insurance applicant as part of an underwriting process to determine a life or health insurance policy, premium, or discount may be provided. The computer-implemented method may include (1) training a processing element to probabilistically correlate an aspect of appearance with a personal and/or health-related characteristic by providing the processing element with a database of images of individuals having known personal or health-related characteristics; (2) receiving with a communication element an image of the insurance applicant; (3) analyzing the image of the insurance applicant with the trained processing element to probabilistically determine the personal and/or health-related characteristic for the insurance applicant; and/or (4) generating or adjusting via the processing element a life or health insurance policy, premium, or discount based at least in part on the probabilistically determined personal and/or health-related characteristic.

The personal and/or health-related characteristic may be a pulse or heart rate. The personal and/or health-related characteristic may indicate, or be associated with, smoking, a lack of smoking, or an amount or frequency of smoking. The personal and/or health-related characteristic may indicate, or be associated with, drug or alcohol use, a lack of drug or alcohol use, or an amount or frequency of drug or alcohol use.

In another aspect, a computer-implemented method for evaluating an insurance applicant as part of an underwriting process to determine an appropriate life insurance premium may be provided. The computer-implemented method may include (1) training a processing element having a neural network to probabilistically or otherwise correlate one or more aspects of appearance with a personal and/or health-related characteristic by providing the processing element with a database of otherwise non-diagnostic conventional images of individuals having known personal and/or health-related characteristics; (2) receiving with a communication element an otherwise non-diagnostic conventional image of the insurance applicant; (3) analyzing with the trained processing element the otherwise non-diagnostic conventional image of the insurance applicant to probabilistically or otherwise determine the personal and/or health-related characteristic for the insurance applicant; (4) using, by the processing element, the probabilistically, otherwise determined personal and/or health-related characteristic to verify information provided by the insurance applicant; and/or (5) automatically determining or adjusting with the processing element a life or health insurance premium or discount based at least in part on the probabilistically or otherwise determined personal and/or health-related characteristic.

In another aspect, a computer-implemented method for evaluating applicant provided images to adjust or generate a life or health insurance policy, premium, or discount may be provided. The computer-implemented method may include (1) receiving, via one or more processors, image data from an applicant's mobile device; (2) comparing, via the one or more processors, the image data with images stored in a database that have corresponding pre-determined health conditions or risk levels; (3) identifying, via the one or more processors, a health condition or risk level for the applicant based upon the comparison of the applicant's image data with the images stored in the database; and/or (4) automatically determining or adjusting, via the one or more processors, a life or health insurance premium or discount based at least in part on the health condition or risk level for the applicant that is determined from their image data to facilitate providing more accurate or appropriate insurance premiums in view of risk, or lack thereof, to insurance customers. The health condition or risk level may be associated with or determined based upon whether or not the applicant smokes, or an amount that the applicant smokes (determined from processor analysis of the applicant's image data). The health condition or risk level may be associated with, or determined based upon, whether or not the applicant uses drugs, or pulse or heart rate of the applicant determined from processor analysis of the applicant's image data.

In another aspect, a computer-implemented method for evaluating applicant provided images to adjust or generate a life or health insurance policy, premium, or discount may be provided. The computer-implemented method may include (1) receiving, via one or more processors (and/or associated transceivers, such as via wireless communication or data transmission over one or more radio links), an indication from an applicant's mobile device that the applicant is interested in applying for insurance and/or receiving an online insurance application from the applicant's mobile device; (2) transmitting, via the one or more processors (and/or associated transceivers), a request for the applicant to transmit image data of the applicant from their mobile device for use with determining an accurate insurance premium or discount; (3) receiving, via one or more processors (and/or associated transceivers), the image data from the applicant's mobile device; (4) identifying, via the one or more processors, a health condition or risk level for the applicant (and/or a personal and/or health-related characteristic) based upon the computer analysis of the applicant's image data; (5) automatically determining or adjusting, via the one or more processors, a life or health insurance premium or discount based at least in part on the health condition or risk level for the applicant that is determined from their image data; and/or (6) transmitting, via the one or more processors (and/or an associated transceiver), the life or health insurance premium or discount to the applicant's mobile device for their review and/or approval to facilitate providing more accurate insurance premiums to insurance customers and enhancing the online customer experience. The health condition or risk level (and/or personal and/or health-related characteristic) determined from computer analysis of the applicant's image data may be a pulse or heart rate. The health condition or risk level (and/or personal and/or health-related characteristic) determined from computer analysis of the applicant's image data may indicate, or may be associated with, smoking, a lack of smoking, or an amount or frequency of smoking. Additionally or alternatively, the health condition or risk level (and/or personal and/or health-related characteristic) determined from computer analysis of the applicant's image data may indicate; or be associated with, drug or alcohol use, a lack of drug or alcohol use, or an amount or frequency of drug or alcohol use.

In another aspect, a computer-implemented method for evaluating applicant provided audio to adjust or generate a life or health insurance policy, premium, or discount may be provided. The computer-implemented method may include (1) receiving, via one or more processors; an indication from an applicant's mobile device that the applicant is interested in applying for insurance and/or receiving an online insurance application from the applicant's mobile device; (2) transmitting, via the one or more processors, a request for the applicant to transmit audio data of the applicant from their mobile device for use with determining an accurate insurance premium or discount; (3) receiving, via one or more processors; the audio data from the applicant's mobile device; (4) identifying, via the one or more processors, a health condition or risk level for the applicant (and/or a personal and/or health-related characteristic) based upon the computer analysis of the applicant's audio data; (5) automatically determining or adjusting, via the one or more processors, a life or health insurance premium or discount based at least in part on the health condition or risk level for the applicant that is determined from their audio data; and/or (6) transmitting, via the one or more processors, the life or health insurance premium or discount to the applicant's mobile device for their review and/or approval to facilitate providing more accurate insurance premiums to insurance customers and enhancing the online customer experience.

The foregoing methods may include additional, less, or alternate functionality, including that discussed elsewhere herein. Further, the foregoing methods may be implemented via one or more local or remote processors and/or transceivers, and/or via computer-executable instructions stored on non-transitory computer-readable medium or media.

VII. Exemplary Computer Systems

In one aspect; a computer system for evaluating an insurance applicant as part of an underwriting process to determine one or more appropriate terms of insurance coverage may be provided. The system may include a communication element configured to receive an image of the insurance applicant; and a processing element trained to probabilistically correlate an aspect of appearance with a personal and/or health-related characteristic by being provided with a database of images of individuals having known personal and/or health-related characteristics, and configured to analyze the image of the insurance applicant to probabilistically determine the personal and/or health-related characteristic for the insurance applicant, and to generate a proposed life or health insurance policy, premium, or discount for the insurance applicant based upon the personal and/or health-related characteristic probabilistically determined from the image.

The communication element may be further configured to receive an voice recording of the insurance applicant; and the processing element is—trained to probabilistically correlate an aspect of voice with the personal and/or health-related characteristic by being provided with a database of voice recordings of individuals having the known personal and/or health related characteristics, and configured to analyze the voice recording of the insurance applicant to probabilistically determine the personal and/or health-related characteristic for the insurance applicant, and generate or adjust a proposed life or health insurance policy, premium, or discount based upon at least in part the probabilistically determined personal and/or health-related characteristic.

The personal and/or health-related characteristic may be a pulse or heart rate. The personal and/or health-related characteristic may indicate, or be associated with, smoking, a lack of smoking, or an amount or frequency of smoking. The personal and/or health-related characteristic may indicate, or be associated with, alcohol or drug use, a lack of alcohol or drug use, or an amount or frequency of alcohol or drug use.

In another aspect, a computer system for evaluating an insurance applicant as part of an underwriting process to determine a life or health insurance policy, premium, or discount may be provided. The computer system may include one or more processors configured to: (1) train a processing element to probabilistically correlate an aspect of appearance with a personal and/or health-related characteristic by providing the processing element with a database of images of individuals having known personal or health-related characteristics; (2) receive with a communication element an image of the insurance applicant; (3) analyze the image of the insurance applicant with the trained processing element to probabilistically determine the personal and/or health-related characteristic for the insurance applicant; and/or (4) generate or adjust via the processing element a life or health insurance policy, premium, or discount based at least in part on the probabilistically determined personal and/or health-related characteristic.

In another aspect, a computer system for evaluating an insurance applicant as part of an underwriting process to determine an appropriate life insurance premium may be provided. The computer system may include one or more processors configured to: (1) train a processing element having a neural network to probabilistically correlate one or more aspects of appearance with a personal and/or health-related characteristic by providing the processing element with a database of otherwise non-diagnostic conventional images of individuals having known personal and/or health-related characteristics; (2) receive with a communication element an otherwise non-diagnostic conventional image of the insurance applicant; (3) analyze with the trained processing element the otherwise non-diagnostic conventional image of the insurance applicant to probabilistically determine the personal and/or health-related characteristic for the insurance applicant; (4) use, by or via the processing element, the probabilistically determined personal and/or health-related characteristic to verify information provided by the insurance applicant; and/or (5) automatically determine or adjust with the processing element a life or health insurance premium or discount based at least in part on the probabilistically determined personal and/or health-related characteristic.

In another aspect, a computer system for evaluating applicant provided images to adjust or generate a life or health insurance policy, premium, or discount may be provided. The computer system may include one or more processors and/or associated transceivers configured to: (1) receive image data from an applicant's mobile device, such as via wireless communication or data transmission over one or more radio links; (2) compare the image data with images stored in a database that have corresponding pre-determined health conditions or risk levels; (3) identify a health condition or risk level (such as low, medium, or high risk) for the applicant based upon the comparison of the applicant's image data with the images stored in the database; and/or (4) automatically determine or adjust a life or health insurance premium or discount based at least in part on the health condition or risk level for the applicant that is determined from their image data to facilitate providing more accurate or appropriate insurance premiums in view of risk, or lack thereof, to insurance customers. The health condition or risk level may be associated with or determined based upon whether or not the applicant smokes, or an amount that the applicant smokes (determined from processor analysis of the applicant's image data). The health condition or risk level may be associated with, or determined based upon, whether or not the applicant uses drugs, or pulse or heart rate of the applicant determined from processor analysis of the applicant's image data.

In another aspect, a computer system for evaluating applicant provided images to adjust or generate a life or health insurance policy, premium, or discount may be provided. The computer system may include one or more processors and/or transceivers configured to: (1) receive an indication, via wireless communication or data transmission over one or more radio links, from an applicant's mobile device that the applicant is interested in applying for insurance and/or receive an online or virtual insurance application from the applicant's mobile device; (2) transmit, via wireless communication or data transmission, a request for the applicant to transmit image data of the applicant from their mobile device for use with determining an accurate insurance premium or discount; (3) receive, via wireless communication or data transmission over one or more radio links, the image data from the applicant's mobile device; (4) identify or determine a health condition or risk level for the applicant (and/or a personal and/or health-related characteristic) based upon the computer analysis of the applicant's image data (with the customer's permission or affirmative consent); (5) automatically determine or adjust a life or health insurance premium or discount based at least in part on the health condition or risk level for the applicant that is determined from their image data; and/or (6) transmit an estimated insurance premium or discount to the applicant's mobile device over one or more radio links for their review and approval to facilitate providing more accurate insurance premiums to insurance customers and enhancing the online customer experience.

In another aspect, a computer system configured for evaluating applicant provided audio to adjust or generate a life or health insurance policy, premium, or discount may be provided. The computer system may include one or more processors and/or transceivers configured to: (1) receive an indication from an applicant's mobile device that the applicant is interested in applying for insurance and/or receiving an online insurance application from the applicant's mobile device; (2) transmit a request for the applicant to transmit audio data of the applicant from their mobile device for use with determining an accurate insurance premium or discount; (3) receive the audio data from the applicant's mobile device; (4) identify or determine a health condition or risk level for the applicant (and/or a personal and/or health-related characteristic) based upon the computer analysis of the applicant's audio data (with the customer's permission or affirmative consent); (5) automatically determine or adjust a life or health insurance premium or discount based at least in part on the health condition or risk level for the applicant that is determined from their audio data; and/or (6) transmit the life or health insurance premium or discount to the applicant's mobile device for their review and/or approval to facilitate providing more accurate insurance premiums to insurance customers and enhancing the online customer experience.

The foregoing computer systems may be configured with additional, less, or alternate functionality, including that discussed elsewhere herein and that described with respect to FIG. 4. The foregoing computer systems may include computer-executable instructions stored on non-transitory computer-readable medium or media.

VIII. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for training and using a neural network to evaluate an insurance applicant as part of an underwriting process to determine an appropriate insurance premium, wherein the neural network controls for consideration of one or more undesired factors which might otherwise be considered by the neural network, the computer-implemented method comprising, via one or more processors:
   training the neural network to probabilistically correlate an aspect of appearance with a personal and/or health-related characteristic by providing the neural network with a training data set of images of individuals having known personal or health-related characteristics, including the one or more undesired factors;
   identifying the one or more undesired factors;
   receiving via a communication element an image of the insurance applicant;
   analyzing with the neural network the image of the insurance applicant to probabilistically determine the personal and/or health-related characteristics for the insurance applicant, wherein such analysis excludes the identified one or more undesired factors; and
   suggesting with the neural network the appropriate insurance premium based at least in part on the probabilistically determined personal and/or health-related characteristic but not on the one or more undesired factors to control for undesired prejudice or discrimination in neural networks.

2. The computer-implemented method as set forth in claim 1, wherein identifying the one or more undesired factors includes training a second neural network using a second training data set that contains only the one or more undesired factors and one or more relevant interaction terms between the one or more undesired factors.

3. The computer-implemented method as set forth in claim 2, wherein causing the neural network to exclude the identified one or more undesired factors when analyzing the image includes combining the neural network and the second neural network to eliminate a bias created by the one or more undesired factors from the neural network's consideration prior to employing the neural network to analyze the image.

4. The computer-implemented method as set forth in claim 1, wherein causing the neural network to exclude the identified one or more undesired factors when analyzing the image includes training the neural network to identify the one or more undesired factors and one or more relevant interaction terms between the one or more undesired factors.

5. The computer-implemented method as set forth in claim 4, wherein causing the neural network to exclude the identified one or more undesired factors when analyzing the image includes instructing the neural network to not consider the identified one or more undesired factors while analyzing the image.

6. The computer-implemented method as set forth in claim 1, wherein the image of the insurance applicant is a selfie image taken with a smartphone and transmitted via a wireless communications network.

7. A computer system configured to train and use a neural network to evaluate an insurance applicant as part of an underwriting process to determine an appropriate insurance premium, wherein the neural network controls for consideration of one or more undesired factors which might otherwise be considered by the neural network, the computer system comprising one or more processors configured to:
   train the neural network to probabilistically correlate an aspect of appearance with a personal and/or health-related characteristic by providing the neural network with a training data set of images of individuals having known personal or health-related characteristics, including the one or more undesired factors;
   identify the one or more undesired factors;
   receive via a communication element an image of the insurance applicant;
   analyze with the neural network the image of the insurance applicant to probabilistically determine the personal and/or health-related characteristics for the insurance applicant, wherein such analysis excludes the identified one or more undesired factors; and
   suggest or recommend with the neural network the appropriate insurance premium based at least in part on the probabilistically determined personal and/or health-related characteristic but not on the one or more undesired factors to control for undesired prejudice or discrimination in machine learning models.

8. The computer system as set forth in claim 7, wherein identifying the one or more undesired factors includes the one or more processors training a second neural network using a second training data set that contains only the one or more undesired factors and one or more relevant interaction terms between the one or more undesired factors.

9. The computer system as set forth in claim 8, wherein causing the neural network to exclude the identified one or more undesired factors when analyzing the image includes the one or more processors combining the neural network and the second neural network to eliminate a bias created by the one or more undesired factors from the neural network's consideration prior to employing the neural network to analyze the image.

10. The computer system as set forth in claim 7, wherein causing the neural network to exclude the identified one or more undesired factors when analyzing the image includes the one or more processors training the neural network to identify the one or more undesired factors and one or more relevant interaction terms between the one or more undesired factors.

11. The computer system as set forth in claim 7, wherein causing the neural network to exclude the identified one or more undesired factors when analyzing the image includes the one or more processors instructing the neural network to not consider the identified one or more undesired factors while analyzing the image.

12. The computer system as set forth in claim 7, wherein the image of the insurance applicant is a selfie image taken with a smartphone and transmitted via a wireless communications network.

13. A computer-implemented method for training and using a neural network to evaluate an insurance applicant as part of an underwriting process to determine an appropriate insurance premium, wherein the neural network controls for consideration of one or more undesired factors which might otherwise be considered by the neural network, the computer-implemented method comprising, via one or more processors:
   training the neural network to probabilistically correlate an aspect of appearance with a personal and/or health-related characteristic by providing the neural network with a training data set of images of individuals having known personal or health-related characteristics, including the one or more undesired factors;

identifying the one or more undesired factors;

receiving via a communication element a selfie image of the insurance applicant taken with a smartphone and transmitted via a wireless communications network;

analyzing with the neural network the selfie image of the insurance applicant to probabilistically determine the personal and/or health-related characteristics for the insurance applicant, wherein such analysis excludes the identified one or more undesired factors; and suggesting with the neural network the appropriate insurance premium based at least in part on the probabilistically determined personal and/or health-related characteristic but not on the one or more undesired factors to control for undesired prejudice or discrimination in the neural network.

14. The computer-implemented method as set forth in claim 13, wherein identifying the one or more undesired factors includes training a linear machine learning model using a second training data set that contains only the one or more undesired factors and one or more relevant interaction terms between the one or more undesired factors.

15. The computer-implemented method as set forth in claim 13, wherein causing the neural network to exclude the identified one or more undesired factors when analyzing the selfie image includes combining the neural network and the linear machine learning model to eliminate a bias created by the one or more undesired factors from consideration by the neural network prior to employing the neural network to analyze the selfie image.

16. The computer-implemented method as set forth in claim 13, wherein causing the neural network to exclude the identified one or more undesired factors when analyzing the selfie image includes instructing the neural network to not consider the identified one or more undesired factors while analyzing the selfie image.

* * * * *